United States Patent Office
3,663,531
Patented May 16, 1972

3,663,531
WATER-INSOLUBLE PHENYL-AZO-PHENYL DYESTUFFS
Hans Wilhelm Liechti, Oberwil, Basel-Land, Switzerland, assignor to Ciba Limited, Basel, Switzerland
No Drawing. Continuation-in-part of application Ser. No. 655,288, July 24, 1967. This application Aug. 12, 1969, Ser. No. 849,500
Claims priority, application Switzerland, July 29, 1966, 10,998/66
Int. Cl. C07c 107/06; C09b 29/34
U.S. Cl. 260—206
8 Claims

ABSTRACT OF THE DISCLOSURE

Nitroazo dyestuffs of the formula

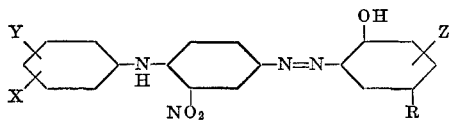

in which X and Y are each hydrogen, chloro, lower alkyl, lower hydroxyalkyl, lower alkoxy, lower hydroxyalkoxy, phenoxy, phenyl-lower alkoxy, lower alkylmercapto, phenylmercapto, or lower alkanoylamino, R is chloro, bromo, lower alkyl, cyclohexyl, phenyl, β-cyanoethyl or lower alkoxy and Z is hydrogen or lower alkyl. The new dyestuffs are useful for dyeing cellulose acetate, cellulose triacetate, polyamide and especially polyester fibers, on which they yield yellow to orange shades of excellent fastness properties.

This application is a continuation-in-part of our application Ser. No. 655,288, filed July 24, 1967 (now abandoned).

The present invention provides water-insoluble nitroazo dyestuffs of the formula

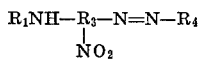

in which $R_1$ represents a benzene residue, $R_3$ represents a phenylene group, in which the amino group is in para-position to the azo group and the nitro group is in meta-position to the azo group and $R_4$ represents a benzene residue containing a hydroxyl group in ortho-position to the azo group.

The present invention also provides a process for preparing water-insoluble nitroza dyestuffs of the above-mentioned formula which comprises condensing an azo dyestuff of the formula

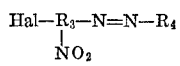

in which $R_3$ represents a phenyl group, in which the halogen atom is in para-position to the azo group and the nitro group is in ortho-position to the azo group and $R_4$ has the meaning given above, with an aminobenzene.

The nitro-halogen-azo dyestuffs used as starting materials may be obtained by coupling a diazotized 1-amino-3-nitro-4-halogen-benzene, especially 1 - amino-3-nitro-4-chlorobenzene, with a phenol capable of coupling in ortho-position to the hydroxyl group. Phenols which are of special interest as coupling components are those corresponding to the formula

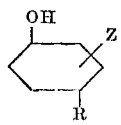

in which R is chlorino, bromino, lower alkyl, cyclohexyl, phenyl, β-cyanoethyl or lower alkoxy and Z is hydrogen or lower alkyl, in which Z represents a hydrogen or a halogen atom or an alkyl, hydroxy or alkoxy group. The following may be mentioned as examples: 4-β-cyanoethylphenol, 2-methyl-4-β-cyanoethylphenol, 3-methyl-4-β - cyanoethylphenol, 6 - β-cyanoethyl-1,3-dihydroxybenzene, 4-chlorophnol, 4-methylphenol, 4-cyclohexylphenol, 4-phenylphenol and 4-isobutylphenol.

It is especially advantagesous to use a nitro-halogeno-azo dyestuff of the formula

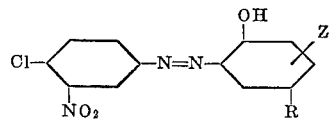

in which R and Z have the above indicated meanings, as the starting material.

The nitro-halogeno-azo dyestuffs obtained are condensed with aminobenzenes, especially those of the formula

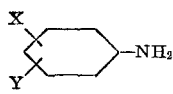

in which X and Y each represents a hydrogen or a halogen atom or an alkyl, alkoxy, phenoxy or acylamino group. The following may be mentioned as examples: aniline, 2-methylaniline, 3-methylaniline, 4-methylaniline, 2-ethylaniline, 4-ethylaniline, 4-hydroxyethyl aniline, 2,5-dimethylaniline, 2- and 4-benzyloxyaniline, 2-methoxyaniline, 2-ethoxyaniline, 4-hydroxyethoxy-aniline, 3-methoxyaniline, 4-methoxyaniline, 4-ethoxyaniline, 2- and 4-ethoxyaniline, 2,4-dimethoxyaniline, 2,4-diethoxyaniline, 2,5-dimethoxyaniline, 2- and 4-aminodiphenylether, 2-chloroaniline, 3-chloroaniline, 4-chloroaniline, 4-acetylaminoaniline, 4-propionylaminoaniline, 4-butyrylaminoaniline, 1-amino-2-methylmercaptobenzene and 1-amino-4-phenylmercaptobenzene.

Thus the present invention especially provides nitro-azo dyestuffs of the formula

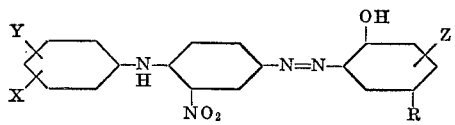

in which X and Y, R and Z have the above indicated meanings. For example, X and Y are each hydrogen, chloro, lower alkyl, lower hydroxyalkyl, lower alkoxy, lower hydroxyalkoxy, phenoxy, phenyl-lower alkoxy, lower alkylmercapto, phenylmercapto, or lower alkanoylamino, R is chloro, bromo, lower alkyl, cyclohexyl, phenyl, β-cyanoethyl or lower alkoxy and Z is hydrogen or lower alkyl. The present invention further provides nitroazo dyestuffs of the formula

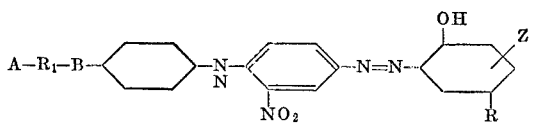

in which A is hydrogen or hydroxy, B is a direct bound or —O—, $R_1$ is lower alkylene and R has the meaning given in claim 1.

The reaction between the nitro-halogen-azo dyestuff and the aminobenzene is advantageously carried out at an elevated temperature in the presence of a diluent, for example, water, or in an organic solvent, for example, benzene, toluene, xylene, chlorobenzene, ortho-dichlorobenzene or nitrobenzene, or in an excess of the aminobenzene. In most cases, the reaction is assisted by the addition of an agent capable of binding acid, for example, sodium acetate, sodium carbonate or sodium bicarbonate.

The new dyestuffs are eminently suitable for dyeing and printing materials, especially fibres and fabrics, for example, materials made from cellulose acetate, cellulose triacetate and polyamides, but especially materials made from aromatic polyesters. They yield strong dyeings possessing excellent properties of fastness, especially fastness to light, sublimation and rubbing.

For dyeing, the new dyestuffs are advantageously used in a state of fine division, and dyeing is carried out in the presence of a dispersing agent, for example, soap, sulphite cellulose waste liquor or a synthetic detergent, or a combination of different wetting and dispersing agents. Prior to dyeing, it is generally advantageous to convert the dyestuffs into dyeing preparations which contain dispersing agent and finely divided dyestuff in a form such that a fine dispersion is formed when the preparation is diluted with water. Such preparations may be made by methods known per se, for example, by precipitating the dyestuff from sulphuric acid and grinding the suspension so obtained with sulphite cellulose waste liquor. If necessary, the dyestuff preparation may also be made by grinding the dyestuff in a highly efficient grinding device in the dry or wet state in the presence or absence of a dispersing agent.

To obtain stronger dyeings on polyethylene terephthalate fibres it is generally advantageous to add a swelling agent to the dyebath or, especially, to carry out the dyeing process under superatmospheric pressure at a temperature above 100° C., for example, at 120° C. Suitable swelling agents are aromatic carboxylic acid acids, for example, benzoic acid or salicylic acid; phenols, for example, ortho- or para-hydroxydiphenyl; aromatic halogen compounds, for example, chlorobenzene, ortho-dichloro-benzene or trichlorobenzene; phenylmethylcarbinol or diphenyl. When dyeing under superatmospheric pressure it is advantageous to render the dyebath slightly acid, for example, by the addition of a weak acid, for example, acetic acid.

By virtue of the fact that the dyestuffs of the invention reserve well on wool, they are eminently suitable for dyeing union fabrics made from polyester fibre and wool.

The dyeings obtained are advantageously subjected to an after-treatment, for example, by heating with an aqueous solution of a non-ionic detergent.

The dyestuffs may also be used for printing. For this purpose, a printing paste is used which contains, for example, the finely divided dyestuff and, if necessary, urea and/or an agent capable of binding acid, in addition to the adjuvants generally used in printing, for example, wetting and thickening agents.

The following examples illustrate the invention. Unless otherwise stated, the parts and percentages are by weight.

EXAMPLE 1

17.25 parts of 3-nitro-4-chloroaniline are diazotized by the usual method and the diazo compound is coupled in an alkaline solution with 14.7 parts of 4-β-cyanoethylphenol. The dyestuff, which precipitates completely, is isolated and dried.

33.05 parts of the azo dyestuff so obtained are introduced into 50 parts of aniline and the batch is stirred for 12 hours at 100 to 105° C. The melt is then poured into dilute hydrochloric acid and the nitroazo dyestuff which precipitates is isolated and dried. The water-insoluble dyestuff of the formula

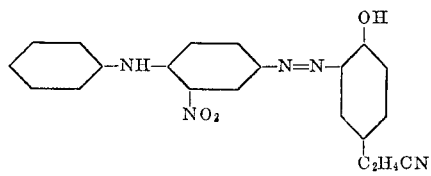

is a brown powder which, in the form of a fine dispersion, dyes cellulose acetate and cellulose triacetate rayon, polyamide fibres and especially polyester fibres reddish yellow shades possessing excellent properties of fastness.

The 4-β-cyanoethylphenol is prepared from acrylonitrile and aluminium chloride by the Friedel-Crafts method.

EXAMPLE 2

33.05 parts of 2-hydroxy-5-β-cyanoethyl-3'-nitro-4'-chloro-1,1'-azobenzene are heated for 12 hours at 110 to 115° C. in 250 parts of chlorobenzene together with 12.3 parts of 4-methoxyaniline and 8.2 parts of anhydrous sodium acetate. The nitroazo dyestuff so formed is isolated and dried.

The water-insoluble dyestuff of the formula

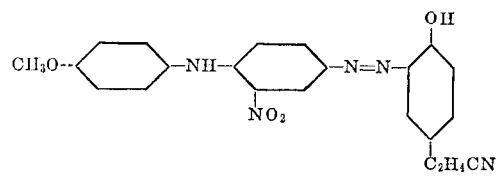

is a brown powder which, in the form of a fine dispersion, dyes cellulose acetate and cellulose triacetate rayon, polyamide fibres and especially polyester fibres attractive orange shades possessing excellent properties of fastness.

Dyestuffs having the same good properties may be obtained by using 2- or 3-methoxyaniline or 2,5-dimethoxyaniline instead of 4-methoxyaniline.

Dyeing procedure 1 part of the dyestuff obtained by the method described in Example 1 is ground wet with 2 parts of a 50% aqueous solution of sulphite cellulose waste liquor and the batch is dried.

The dyestuff preparation so obtained is stirred together with 40 parts of a 10% aqueous solution of a condensation product obtained from octadecyl alcohol and 20 mols of ethylene oxide, and then 4 parts of a 40% acetic acid solution are added. A dyebath of 4,000 parts is prepared therefrom by dilution with water.

100 parts of cleansed polyester fibre material are entered into this dyebath at 50° C., the temperature is raised to 120 to 130° C. within half an hour and dyeing is carried out for one hour at that temperature in a closed vessel. The material is then rinsed. A strong yellow dyeing possessing excellent fastness to light and sublimation is obtained.

EXAMPLE 3

31.2 parts of 2-hydroxy-5-chloro-3'-nitro-4'-chloro-1,1'-azobenzene are heated for 20 hours at 130 to 135° C. in 200 parts of xylene together with 18.5 parts of 4-aminodiphenylether and 13.8 parts of potassium carbonate. The nitroazo dyestuff so formed is isolated and dried.

The water-insoluble dyestuff of the formula

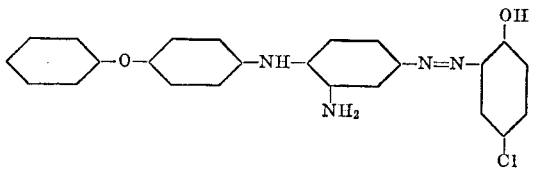

is a brown powder which, in the form of a fine dispersion, dyes cellulose acetate and cellulose triacetate rayon, polyamide fibres and especially polyester fibres yellow shades possessing excellent properties of fastness.

Equally good dyestuffs may be obtained when the azobenzenes listed in Column I of the following table are condensed with the amines shown in Column II. The shades produced on polyester fibres are shown in Column III.

| | I | II | III |
|---|---|---|---|
| 1 | 2-hydroxy-5-chloro-3'-nitro-4'-chloro-1,1'-azo benzene | Aminobenzene | Yellow. |
| 2 | do | 2-aminotoluene | Do. |
| 3 | do | 4-aminotoluene | Do. |
| 4 | do | 3-aminoanisole | Do. |
| 5 | do | 2-aminoanisole | Orange. |
| 6 | do | 4-aminoanisole | Do. |
| 7 | do | 2-aminophenetole | Do. |
| 8 | do | 4-aminophenetole | Do. |
| 9 | do | 2,4-dimethoxyaniline | Brown-orange. |
| 10 | do | 2,4-diethoxyaniline | Orange-brown. |
| 11 | do | 4-acetylaminoaniline | Orange. |
| 12 | 2-hydroxy-5-cyclohexyl-3'-nitro-4'-chloro-1,1'-azobenzene | Aminobenzene | Yellow. |
| 13 | do | 2-aminotoluene | Do. |
| 14 | do | 4-aminotoluene | Do. |
| 15 | do | 3-aminoanisole | Do. |
| 16 | do | 2-aminoanisole | Orange. |
| 17 | do | 4-aminoanisole | Do. |
| 18 | do | 2-aminophenetole | Do. |
| 19 | do | 4-aminophenetole | Do. |
| 20 | do | 2,4-dimethoxyaniline | Brown-orange. |
| 21 | do | 2,4-diethoxyaniline | Do. |
| 22 | do | 4-acetylaminoaniline | Orange. |
| 23 | do | 4-aminodiphenylether | Reddish yellow. |
| 24 | 2-hydroxy-5-phenyl-3'-nitro-4'-chloro-1,1'-azobenzene | Aminobenzene | Yellow. |
| 25 | do | 2-aminotoluene | Do. |
| 26 | do | 4-aminotoluene | Do. |
| 27 | do | 3-aminoanisole | Do. |
| 28 | do | 2-aminoanisole | Orange. |
| 29 | do | 4-aminoanisole | Do. |
| 30 | do | 2-aminophenetole | Do. |
| 31 | do | 4-aminophenetole | Do. |
| 32 | do | 2,4-dimethoxyaniline | Brown-orange. |
| 33 | do | 2,4-diethoxyaniline | Do. |
| 34 | do | 4-acetylaminoaniline | Orange. |
| 35 | do | 4-aminodiphenylether | Reddish yellow. |
| 36 | 2-hydroxy-5-methoxy-3'-nitro-4'-chloro-1,1'-azobenzene | Aniline | Yellow. |
| 37 | do | 2-methylaniline | Do. |
| 38 | do | 4-methylaniline | Do. |
| 39 | do | 3-methoxyaniline | Do. |
| 40 | do | 2-methoxyaniline | Orange. |
| 41 | do | 4-methoxyaniline | Do. |
| 42 | do | 2-ethoxyaniline | Do. |
| 43 | do | 4-ethoxyaniline | Do. |
| 44 | do | 2,4-dimethoxyaniline | Brown-orange. |
| 45 | do | 2,4-diethoxyaniline | Do. |
| 46 | do | 4-acetylaminoaniline | Orange. |
| 47 | do | 4-aminodiphenylether | Reddish yellow. |
| 48 | 2-hydroxy-5-methyl-3'-nitro-4'-chloro-1,1'-azobenzene | Aniline | Yellow. |
| 49 | do | 2-methylaniline | Do. |
| 50 | do | 4-methylaniline | Do. |
| 51 | do | 3-methoxyaniline | Do. |
| 52 | do | 2-methoxyaniline | Orange. |
| 53 | do | 4-methoxyaniline | Do. |
| 54 | do | 2-ethoxyaniline | Do. |
| 55 | do | 4-ethoxyaniline | Do. |
| 56 | do | 2,4-dimethoxyaniline | Brown orange. |
| 57 | do | 2,4-diethoxyaniline | Do. |
| 58 | do | 4-acetylaminoaniline | Orange. |
| 59 | do | 4-aminodiphenylether | Reddish yellow. |
| 60 | 2-hydroxy-3-methyl-5-β-cyanoethyl-3'-nitro-4'-chloro-1,1'-azobenzene | Aniline | Yellow. |
| 61 | do | 2-methylaniline | Do. |
| 62 | do | 4-methylaniline | Do. |
| 63 | do | 3-methylaniline | Do. |
| 64 | do | 2-methoxyaniline | Orange. |
| 65 | do | 4-methoxyaniline | Do. |
| 66 | do | 2-ethoxyaniline | Do. |
| 67 | do | 4-ethoxyaniline | Do. |
| 68 | do | 2,4-dimethoxyaniline | Brown orange. |
| 69 | do | 2,4-diethoxyaniline | Do. |
| 70 | do | 4-acetylaminoaniline | Do. |
| 71 | do | 4-aminodiphenylether | Reddish yellow. |
| 72 | do | Aniline | Yellow. |
| 73 | do | 2-methylaniline | Do. |
| 74 | do | 4-methylaniline | Do. |
| 75 | do | 3-methylaniline | Do. |
| 76 | do | 2-methoxyaniline | Orange. |
| 77 | do | 4-methoxyaniline | Do. |
| 78 | do | 2-ethoxyaniline | Do. |
| 79 | do | 4-ethoxyaniline | Do. |
| 80 | do | 2,4-dimethoxyaniline | Brown orange. |
| 81 | do | 2,4-diethoxyaniline | Do. |
| 82 | do | 4-acetylaminoaniline | Orange. |
| 83 | do | 4-propionylamino-aniline | Do. |
| 84 | do | 4-aminodiphenylether | Reddish yellow. |
| 85 | 2-hydroxy-5-β-cyano-ethyl-3'-nitro-4'-chloro-1,1'-azobenzene | 4-benzyloxyaniline | Orange. |
| 86 | 2-hydroxy-5-bromo-3'-nitro-4'-chloro-1,1'-azobenzene | 4-aminodiphenylether | Yellow. |
| 87 | 2-hydroxy-5-chloro-3'-nitro-4'-chloro-1,1'-azobenzene | 4-β-hydroxyethylaniline | Golden yellow. |
| 88 | do | 4-β-hydroxyethoxyaniline | Orange. |
| 89 | 2-hydroxy-5-methyl-3'-nitro-4'-chloro-1,1'-azobenzene | 4-β-hydroxyethyl-aniline | Golden yellow. |
|  |  | do | Orange. |
| 90 | 2-hydroxy-5-methoxy-3'-nitro-4'-chloro-1,1'-azobenzene | 4-β-hydroxyethylaniline | Golden yellow. |
| 91 | do | 4-β-hydroxy-ethoxyaniline | Orange. |
| 92 | 2-hydroxy-5-cyclohexyl-3'-nitro-4'-chloro-1,1'-azobenzene | 4-β-hydroxyethylaniline | Golden yellow. |
|  |  | 4-β-hydroxyethoxyaniline | Orange. |
| 93 | hydroxy-5-phenyl-3'-nitro-4'-chloro-1,1'-azobenzene | 4-β-hydroxyethylaniline | Golden yellow. |
| 94 | do | do | Orange. |
| 95 | 2-hydroxy-5-isopentyl-3'-nitro-4'-chloro-1,1'-azobenzene | do | Golden yellow. |
| 96 | do | 4-β-hydroxyethoxyaniline | Orange. |
| 97 | 2-hydroxy-5-β-cyanoethyl-3'-nitro-4'-chloro-1,1'-azobenzene | 4-β-hydroxyethylaniline | Golden yellow. |
| 98 | do | 4-β-hydroxyethoxyaniline | Orange. |
| 99 | 2-hydroxy-3-methyl-5-β-cyanethyl-3'-nitro-4'-chloro-1,1'-azobenzene | 4-β-hydroxyethylaniline | Golden yellow. |
| 100 | do | 4-β-hydroxyethoxyaniline | Orange. |
| 101 | do | 4-β-hydroxymethylaniline | Golden yellow. |
| 102 | do | 4-ethylaniline | Do. |
| 103 | 2-hydroxy-5-ethyl-3'-nitro-4'-chloro-1,1'-azobenzene | 4-β-hydroethylaniline | Do. |

What we claim is:
1. A water insoluble nitroazo dyestuff of the formula

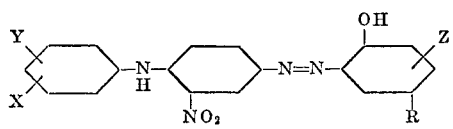

in which X is hydrogen, chloro, lower alkyl, lower hydroxyalkyl lower alkoxy, lower hydroxyalkoxy, phenoxy, phenyl-lower alkoxy, lower alkylmercapto, phenylmercapto, or lower alkanoylamino, Y is hydrogen; or lower alkyl or lower alkoxy when X is lower alkyl or lower alkoxy, R is chloro, bromo, lower alkyl, cyclohexyl, phenyl, β-cyanoethyl or lower alkoxy and Z is hydrogen; or lower alkyl or hydroxy when R is cyanoethyl.

2. A water insoluble nitroazo dyestuff of claim 1 of the formula

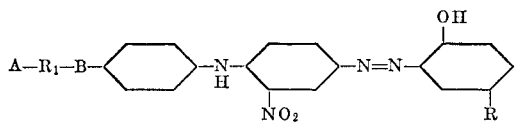

in which A is hydrogen or hydroxy, B is a direct bond or —O—, $R_1$ is lower alkylene and R is chloro, bromo, lower alkyl, cyclohexyl, phenyl, β-cyanoethyl or lower alkoxy.

3. The dyestuff of the formula

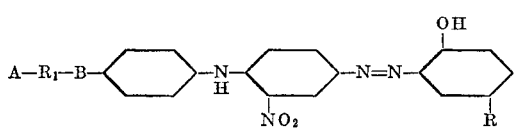

in which A is hydrogen or hydroxy, B is a direct bond or —O—, $R_1$ is lower alkylene and R is cyanoethyl, phenyl or cyclohexyl.

4. The dyestuff of the formula

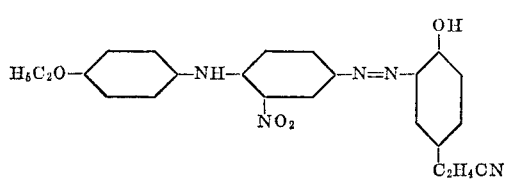

5. The dyestuff of the formula

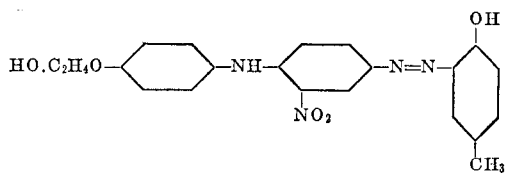

6. The dyestuff of the formula

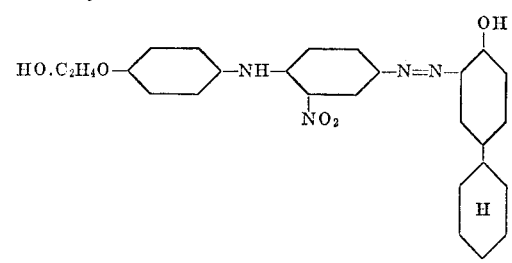

7. The dyestuff of the formula

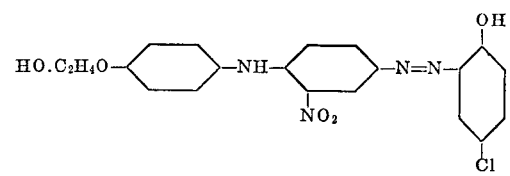

8. The dyestuff of the formula

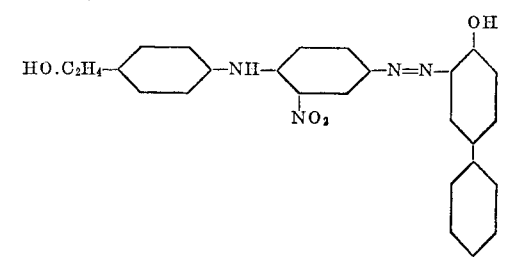

References Cited
UNITED STATES PATENTS 983,805　2/1911　Berthold _____ 260—206
3,516,982　6/1970　Dimroth et al. _____ 260—206

JOSEPH REBOLD, Primary Examiner
C. F. WARREN, Assistant Examiner

U.S. Cl. X.R.
8—41 C, 175, 176; 260—207

PO-1050
(5/69)

UNITED STATES PATENT OFFICE
CERTIFICATE OF CORRECTION

Patent No. 3,663,531                    Dated May 16, 1972

Inventor(s) HANS WILHELM LIECHTI

It is certified that error appears in the above-identified patent and that said Letters Patent are hereby corrected as shown below:

Column 1, line 5 should read --- assignor to

CIBA-GEIGY AG, Basel, Switzerland ---.

Signed and sealed this 2nd day of April 1974.

(SEAL)
Attest:

EDWARD M. FLETCHER, JR.                C. MARSHALL DANN
Attesting Officer                      Commissioner of Patents